(12) United States Patent
Deciry et al.

(10) Patent No.: US 7,468,491 B2
(45) Date of Patent: Dec. 23, 2008

(54) ACCESSORY FOR LIFTING AND BONDING WIRE CABLE TRAYS

(75) Inventors: James Deciry, Compiegne (FR); Stephane Quertelet, Remy (FR)

(73) Assignee: I.C.M. Group, Montbard (FR)

( * ) Notice: Subject to any disclaimer, the term of this patent is extended or adjusted under 35 U.S.C. 154(b) by 29 days.

(21) Appl. No.: 10/583,547

(22) PCT Filed: Dec. 13, 2004

(86) PCT No.: PCT/FR2004/003198

§ 371 (c)(1),
(2), (4) Date: Jul. 19, 2006

(87) PCT Pub. No.: WO2005/062436

PCT Pub. Date: Jul. 7, 2005

(65) Prior Publication Data

US 2007/0164181 A1    Jul. 19, 2007

(30) Foreign Application Priority Data

Dec. 19, 2003  (FR) .................................. 03 15042

(51) Int. Cl.
*H02G 3/04* (2006.01)
(52) U.S. Cl. .................. 174/480; 174/135; 248/251
(58) Field of Classification Search ................. 174/480, 174/135; 248/251
See application file for complete search history.

(56) References Cited

U.S. PATENT DOCUMENTS

| | | | |
|---|---|---|---|
| 5,899,041 A | 5/1999 | Durin | |
| 6,590,154 B1 * | 7/2003 | Badey et al. | 174/480 |

FOREIGN PATENT DOCUMENTS

| | | |
|---|---|---|
| DE | 20 36 325 | 1/1972 |
| EP | 1318585 | 11/2003 |
| GB | 2 301 951 | 12/1996 |

* cited by examiner

Primary Examiner—Chau N Nguyen
(74) Attorney, Agent, or Firm—Young & Thompson

(57) ABSTRACT

This accessory is intended for wire cable trays comprising longitudinal warp wires and transverse weft wires linking the warp wires, the wire cable tray having a bottom adapted to receive electric cables or the like and two side flanges.

The accessory comprises an upper face (4) raised by at least two feet (2).

The upper face (4) comprises not only two first housings (10) disposed parallel to each other and each adapted to receive a weft wire but also at least one housing (12) substantially perpendicular to the first two housings (10).

At least one locking device (16) is provided on each side of a median line between the first two housings (10).

16 Claims, 2 Drawing Sheets

ACCESSORY FOR LIFTING AND BONDING WIRE CABLE TRAYS

FIELD OF THE INVENTION

The present invention relates to an accessory for raising and splicing together wire cable trays.

The field of the invention is the mounting and splicing together of wire cable trays. Cable trays are used to ensure the support, housing and protection of longilinear items such as electric cables or tubes, for example pneumatic or hydraulic connecting tubes.

BACKGROUND OF THE INVENTION

A wire cable tray generally has an elongate form and is of U-section. It comprises longitudinal wires, also termed warp wires, and transverse wires, also termed weft wires. The warp wires are generally straight and the weft wires are U-shaped. The weft wires are welded to the warp wires and are regularly spaced. The cable tray so produced has a bottom adapted to serve as a support for the cables or the like, and side walls, or flanges, adapted to hold the cables on the bottom.

In all that follows, for the sake of simplicity and clarity, the description will be made with reference to electric cables. However, the invention applies to any other type of longilinear item that can be supported by a wire cable tray: tube for conveyance of fluid (pneumatic or hydraulic), optic fiber, etc.

Such cable trays are appropriate anywhere that it is desired to pass electric cables. However, when a cable tray is adapted to support electric cables at the floor, it is preferable to raise it in order to protect the electric cables which it conveys, in particular in case of flooding.

To raise a cable tray, it is known for example to have feet regularly distributed along the cable tray. For example, there may be two feet on the same weft wire and this may be repeated at regular intervals. It is also known to rest the cable tray on a stirrup fixed to the floor. The connection between the stirrup and the cable tray is made for example using hooks formed on the stirrup which come into engagement with a warp wire of the cable tray.

To splice together two cable trays, it is known to use for example a splicing member for linking two cable trays placed end to end. Two weft wires are then disposed face to face. The splicing member comprises for example clipping means enabling it to clip onto each of the weft wires that face each other, so providing the connection between the cable trays.

The devices known from the prior art are not intended to provide at the same time the raising and the splicing together of two cable trays. Furthermore, the known raising accessories most often cannot be mounted in advance on the cable tray for which they are intended. When such a pre-mounting is possible, this is carried out using nuts and bolts or welds. Such a pre-mounting is costly in terms of time.

OBJECT OF THE INVENTION

The present invention thus aims to provide an accessory making it possible at the same time to raise and splice together wire cable trays. This accessory is preferably also pre-mountable on such a cable tray.

SUMMARY OF THE INVENTION

To that end it provides an accessory for raising and splicing together wire cable trays comprising longitudinal warp wires and transverse weft wires linking the warp wires, the wire cable tray having a bottom adapted to receive electric cables or the like and two side flanges.

According to the invention, this accessory comprises an upper face raised by at least two feet, the upper face comprises not only two first housings disposed parallel to each other and each adapted to receive a weft wire, but also at least one housing substantially perpendicular to the first two housings, and at least one locking device is provided on each side of a median line between the first two housings.

In this way the feet of the device according to the invention make it possible to raise a cable tray which bears on the upper face of the device. The first housings of the upper face are each adapted to receive a weft wire. The accessory according to the invention may thus receive the two ends, placed facing each other, of two wire cable trays to form a splice. The other housing may then receive either two warp wires in the case of forming a splice, or a single warp wire in the other cases. The locking means then make it possible to join one cable tray or (in the case of forming a splice) two cable trays with the accessory.

In a first embodiment, the first two housings each have, for example, the form of a groove of which the form is adapted to that of a weft wire. The housing substantially perpendicular to the first housings is for example formed by a cut-out in the upper face of the accessory.

The locking devices are for example intended to lock a warp wire and are then advantageously disposed on respective opposite sides of the first housings intended for the weft wires to facilitate the locking of two cable trays during splicing together.

In a preferred embodiment, each locking device comprises a tab that can be folded down associated with a housing, the tab, in its non folded down position, enabling a wire to be placed in the corresponding housing and in its folded down position enabling the wire to be held in its housing. This embodiment makes it possible to lock a wire (warp or weft) easily and rapidly in its housing and also enables pre-mounting of the accessory according to the invention on a cable tray. In this embodiment, the tab advantageously has a substantially rectangular cut-out enabling the end of a flat-bladed screwdriver to be inserted in order to bring the tab into locked position.

In the case where the housing perpendicular to the first two housings is formed by making a cut-out in the upper face of the accessory, the cut-out has for example the form of a channel overhung by two locking tabs, a warp wire being able to locate between the bottom of the channel and the locking tabs. A warp wire may then be introduced into the channel then slid under the locking tab.

To be also able to perform the raising and the splicing together of sheet metal cable trays, the upper face advantageously comprises at least two bores. These latter may then cooperate with the apertures that are generally found in sheet metal cable trays to affix such a cable tray on the accessory according to the invention.

For fixing the accessory on the floor or any other supporting surface, provision is for example made for at least one of its feet to be provided with fixing means. These latter may be a rim in which two (or more) bores are made.

In the preferred embodiment, the accessory according to the invention takes the form of a part having a profiled cross-section substantially the shape of an inverted U, the branches of the U forming the legs of the accessory, and the base of the U the upper face thereof. Such a part may easily be manufactured and is of low production cost.

In this preferred embodiment, a branch of the U is for example folded at a right angle outwardly of the U at its opposite end from the base so forming a fixing rim. It may also be provided that the base of the U comprises two longitudinal grooves of which the concave form is directed outwardly of the U and furthermore two transverse cut-outs which continue over a portion of the height of the branches of the U so forming two transverse channels. These grooves and channels then form the housings adapted to receive warp and weft wires of wire cable trays. To produce the locking means, the transverse channels are for example each overhung by two tabs, and the two tabs of a channel are disposed on respective opposite sides of the longitudinal grooves and are attached to the same edge of the channel. To then enable better locking in the corresponding channel, the cut-out in the branches of the U has, not only adjacent the bottom of the channel but also adjacent the tabs, an inclined surface.

BRIEF DESCRIPTION OF THE DRAWINGS

Details and advantages of the present invention will be more apparent from the following description, made with reference to the accompanying diagrammatic drawing in which.

DETAILED DESCRIPTION OF THE INVENTION

Figure 1:
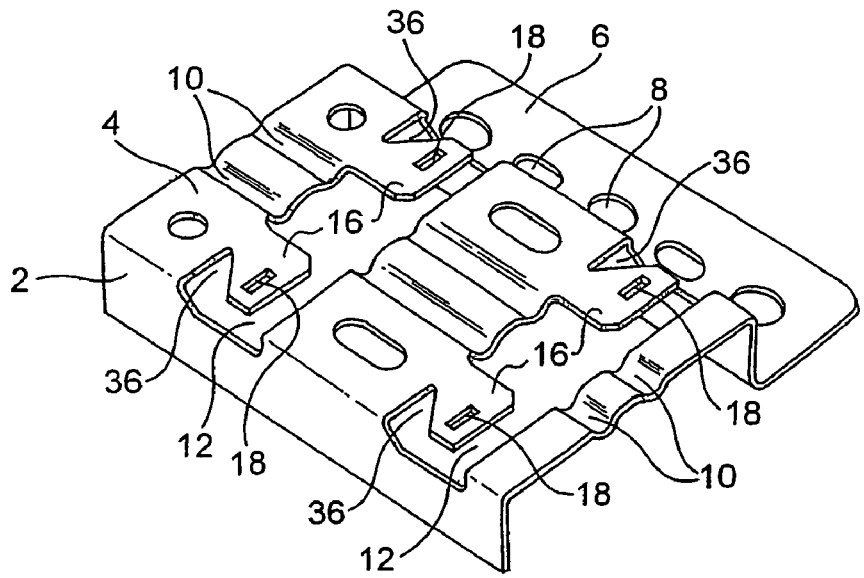
FIG. 1 is a perspective view of an accessory according to the present invention.
Figure 2:
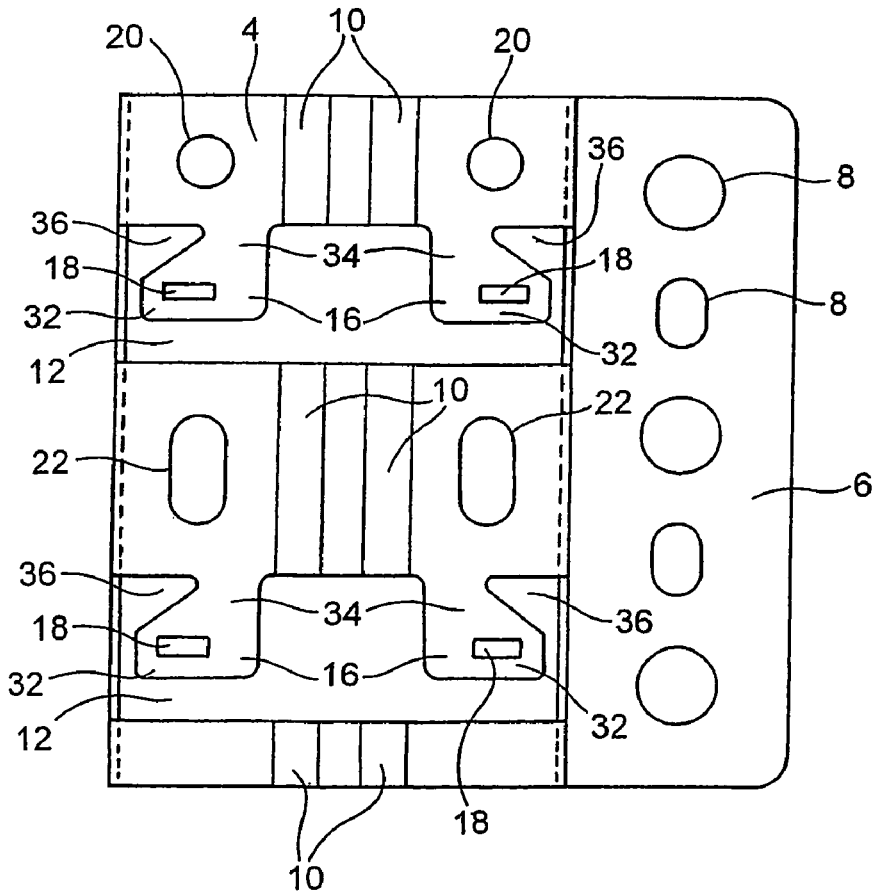
FIG. 2 is a view from above of the accessory represented in FIG. 1.
Figure 3:
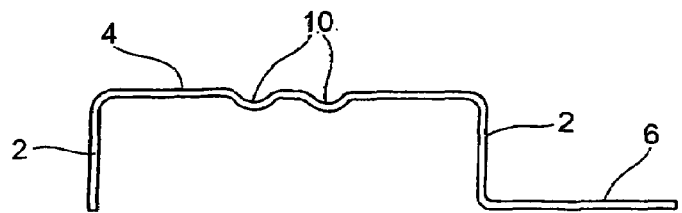
FIG. 3 is a front view of the accessory of FIGS. 1 and 2.

The accessory represented in the drawing has the form of a metal part of profiled section produced from sheet metal that is cut out and folded. By way of indication, the thickness of the sheet metal is of the order of a millimeter. The material used is for example steel and the sheet metal is for example treated by continuous galvanization using the Sendzimir™ process.

This part of profiled section has the general form of an inverted U thus forming a bridging member. The branches of the U form two feet 2 and an upper face 4. It is assumed in what follows in the description that the feet 2 are substantially vertical and the upper face 4 substantially horizontal. The feet 2 are adapted to rest on a substantially flat floor and make it possible to keep the upper face 4 spaced apart from that floor and parallel thereto.

As can be seen in the drawings, a foot 2 is provided with a rim 6. This latter is formed at the end of the foot 2 concerned, remote from the upper face 4. The rim 6 extends horizontally and is adapted for fixing the accessory to a floor. To that end, bores 8 are formed in the rim 6. The fixing of the accessory to the floor may thus be carried out using a fastener gun or using conventional means such as screws and/or nuts and bolts.

The upper face 4 of the accessory comprises two longitudinal grooves 10. These grooves 10 have a concave form directed outwardly of the U, that is to say, given the orientation opted for, upwardly. These longitudinal grooves 10 extend over the entire length of the part of profiled section. Their form is complementary to the form of a weft wire of a cable tray for which the accessory represented in intended. Later, with reference to FIG. 5, the manner will be indicated in which a cable tray cooperates with the accessory according to the invention described here.

The upper face 4 also comprises two transverse cut-outs forming two channels 12. The two cut-outs formed are identical and each extends over the entire width of the upper face 4 as well as over a portion of the height of the feet 2. Thus two notches 14, as seen in side view (FIG. 4), are to be found at the top of each foot 2.

The channels 12 are each overhung by two tabs 16. In its initial position, each tab 16 extends in a horizontal plane corresponding to the plane of the upper face 4. The two tabs 16 of the same channel 12 are attached to the same edge of the channel 12 and are furthermore located on respective opposite sides of the longitudinal grooves 10. Each tab 16 has a rectangular cut-out 18 adapted to receive the end of a flat-bladed screwdriver. The accessory described here thus comprises two identical assemblies, each of these assemblies comprising a channel 12 and two tabs 16. These assemblies are disposed in parallel, all the tabs 16 being located on the same side.

Bores made in the upper face 4 of the accessory can also be noted. In the embodiment represented in the drawing, two circular bores 20 and two oblong holes 22 have been made. The circular bores 20 are located between a channel 12 and a transverse edge of the part of profiled section and are situated on respective opposite sides of the longitudinal grooves 10. The oblong holes 22 are disposed on respective opposite sides of the longitudinal grooves 10, between the two channels 12.

Figure 4:
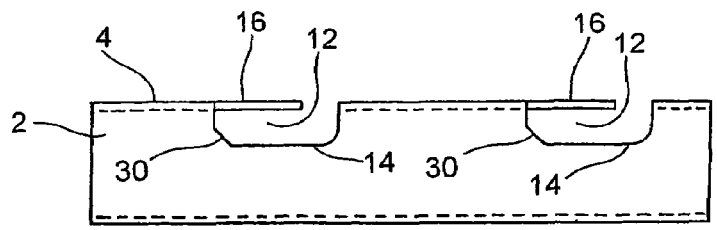
FIG. 4 is a view from the side of the accessory presented in FIGS. 1 to 3.
Figure 5:
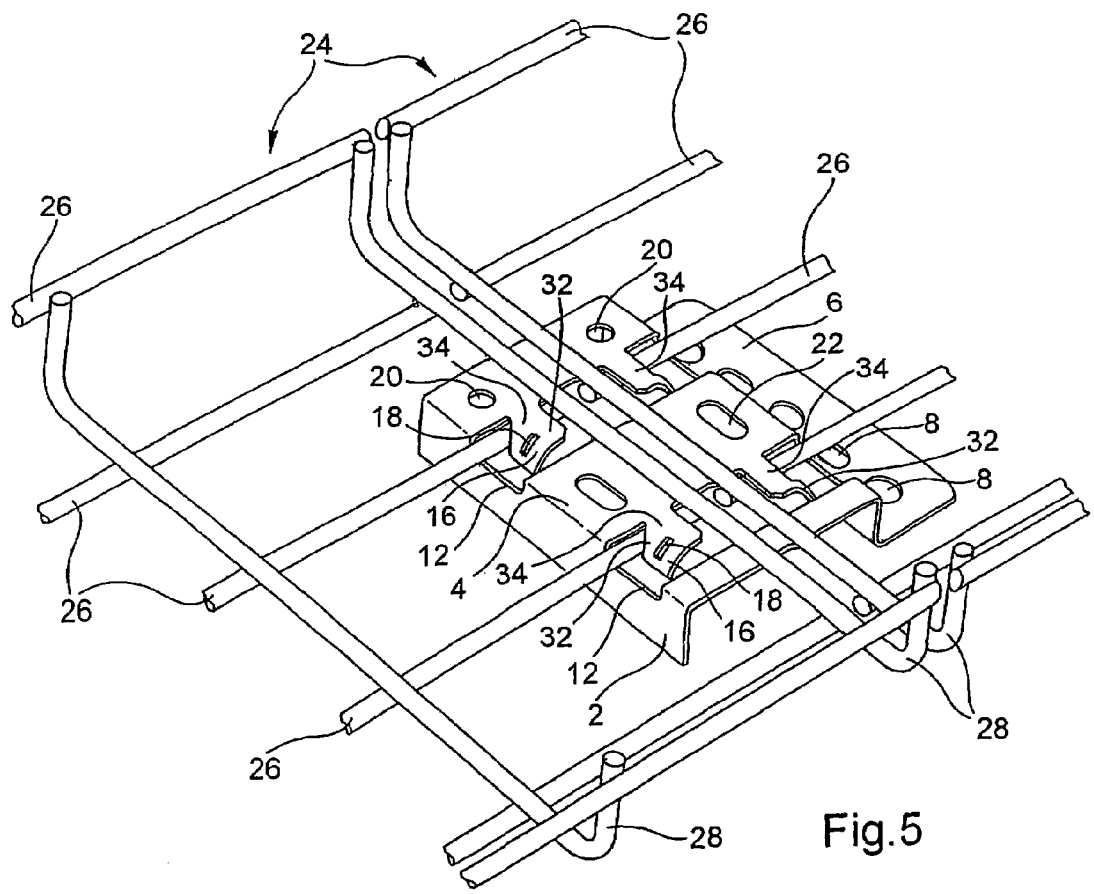
FIG. 5 is a perspective view showing the accessory according to the invention used at the same time as a splicing and a raising member.

FIG. 5 shows how the accessory represented in FIGS. 1 to 4 cooperate with two cable trays 24 at the same time to splice them together and to raise them.

Each cable tray 24 comprises longitudinal warp wires 26 and transverse weft wires 28. It is assumed here that the warp wires are straight wires whereas the weft wires 28 are U-shaped. The structure of such a cable tray is known to the person skilled in the art and is not described in more detail here.

To perform the splicing together of the two cable trays 24, they are placed end to end. The cable trays 24 are generally formed such that a weft wire 28 is to be found at each of their ends. Thus two weft wires 28 are located face to face at the junction of the two cable trays 24.

Each of the end-most weft wires 28 is then disposed in a longitudinal groove 10. The channels 12 are each adapted to receive a warp wire 26. As indicated above, the channels 12 are overhung by the tabs 16. These latter thus hinder the access to the channel 12. However, a passage is left free between the end of the tabs 16 and the opposite edge of the channel from the edge on which are fixed the tabs 16. This free space is sufficient to allow the passage of a warp wire 26. Furthermore, the distance separating the two channels 12 corresponds to the distance separating two neighboring warp wires 26 the bottom of a cable tray 24. The pitch between the two channels 12 thus corresponds to the pitch of the warp wires 26 at the bottom of a cable tray 24. Each cable tray 24 is placed such that two warp wires 26 of its bottom are situated adjacent a free space allowing access to a channel 12. The warp wires 26 then "fall" to the bottom of the corresponding channel 12 while the weft wire 28 fits into the longitudinal groove 10. The depth of the channel 12 is greater than the diameter of the warp wire 26. Thus, the notches 14 formed in the feet 2 have a greater height than that diameter.

Once the cable tray 24 has been so positioned with respect to the accessory, a relative movement between the accessory according to the invention and the cable tray is made. This movement is made in the direction given by the longitudinal grooves 10. The weft wire 28 thus slides in the corresponding longitudinal groove 10. During this movement, the warp wires 26 located in the channels 12 move into place under the tabs 16. This movement continues until the warp wires 26 come into abutment at the side where the edge of the channel is that bears the tabs 16. It can be noted in FIG. 4 that the bottom of the notches 14 on this side has an inclined surface 30 so as to guide the warp wire 26 into abutment upwardly in order come to bear under the tab 16. This inclined surface 30 also makes it possible to accept warp wires 26 of different diameters.

It then suffices to fold down the tabs 16 towards the bottom of the channel 12 so as to trap the corresponding warp wire 26. The tab 16 is folded for example by inserting the end of a flat-bladed screwdriver into the rectangular cut-out 18 provided for that purpose in each tab 16.

Each tab 16 has a zone 32 adapted for the locking of a warp wire 26 in the corresponding channel 12 as well as a linking bridge portion 34 making it possible to connect the locking zone 32 to the edge of the channel 12, that is to say also to the upper face 4. The linking bridge portion 34 is formed in such a manner that between the locking zone 32 of the tab 16 and the corresponding edge of the channel 12 a free triangular space 36 remains. The rectangular cut-out 18 is disposed in the locking zone 32 so as to be located so as to be situated at the side where the triangular space 36 is. This latter, on folding down the tab 16, makes it possible for the corresponding warp wire 26 to be pushed to the bottom of the channel 12 and under the linking bridge portion 34.

Proper attachment of the accessory according to the invention to each of the cable trays 24 is thus achieved. A first bearing zone for a cable tray 24 on the accessory described is formed between the longitudinal groove 10 and the corresponding weft wire 28. As stated above, the form of the longitudinal groove 10 is adapted to that of the weft wire: this longitudinal groove 10 thus has the form of a part of a cylinder of which the inside diameter substantially corresponds to the outer diameter of a weft wire 28.

At a warp wire 26, two bearing zones are formed. Firstly the warp wire comes into abutment at the bottom of the channel 12 on the inclined surface 30 of the corresponding cut-out 14 (or possibly on a substantially vertical edge of that cut-out). Next, as described above, the warp wire comes into abutment under the tab 16, adjacent the linking bridge portion 34.

In the description made with reference to FIG. 5, the accessory of FIGS. 1 and 4 is used to perform at the same time the splicing together of two cable trays and the raising thereof. This accessory may also be used solely for raising a cable tray. In this case, a weft wire 28 of the cable tray 24 fits in one of the two longitudinal grooves 10 of the accessory and two warp wires 26 fit in the two channels 12 of the accessory. After the warp wires 26 have been slid under the tabs 16, these latter are folded down and the raising member is thus fixed onto the cable tray 24.

Pre-mounting of the accessory may be performed on a cable tray 24. According to the length of the latter, it may for example be provided to mount one accessory towards the center of the cable tray and another at one of its ends. The accessory disposed at the end is then ready to receive a second cable tray which it suffices to position, to slide it transversely to come into abutment at the bottom of the channel and to lock by folding down the two tabs 16.

The accessory described above also makes it possible to ensure proper electrical continuity between two successive cable trays and proper earthing of those cable trays. More particularly, as indicated above, three bearing zones are formed and these ensure excellent electrical continuity.

The accessory has been described above with reference to fixing to a floor (horizontal). It may also be used in certain circumstances to fix a cable tray to a wall (vertical), the cable tray then being placed horizontally or vertically.

The accessory described is particularly well adapted for raising and splicing together wire cable trays. However, by virtue of the two circular bores 20 and the oblong holes 22 this accessory may also be used with sheet metal cable trays. Such cable trays are generally perforated and fixing of such cable trays onto an accessory such as described above may be envisaged using screws and/or nuts and bolts.

As is apparent from all the above, the accessory described above may be qualified as universal. This is because is makes it possible to perform the splicing together of two wire cable trays that may be of different diameters (or of sheet metal), the raising of such cable trays, the electrical continuity between two cable trays, and the earthing of a cable tray. Furthermore, it has the advantage of being able to be pre-mounted without screws, nuts and bolts, or other fastening means on a cable tray by simply folding down two (or four) tabs. Furthermore, it has very low aggressivity with respect to cables that are liable to be stretched in the cable tray. In addition it is economical to produce since it may be obtained in multiple specimens from a piece of sheet metal cut out and folded on a press.

The present invention is not limited to the preferred embodiment described above by way of non-limiting example. It concerns all the variant embodiments within the capability of the person skilled in the art in the context of the claims given below.

Thus for example, whereas the accessory described is intended for cooperation with two warp wires of a wire cable tray, it is possible for it to comprise only one channel and thus to receive only one warp wire. Such an accessory could be used for cable trays of small size. On the contrary, for large cable trays, an accessory with three (or more) channels may also be envisaged.

The accessory described comprises channels that are each adapted to receive a warp wire and grooves that are each adapted to receive a weft wire. It could be envisaged to receive a weft wire in a channel and a warp wire in a groove.

The locking means described perform the locking of a warp wire. Locking with respect to a weft wire could also be envisaged. As regards those locking means, other means may for example be envisaged. Provision could for example be made to apply a clip to a weft or warp wire.

The invention claimed is:

1. An accessory for raising and splicing together wire cable trays (24) comprising longitudinal warp wires (26) and transverse weft wires (28) linking the warp wires (26), the wire cable tray (24) having a bottom adapted to receive electric cables and two side flanges,
    characterized in that it comprises an upper face (4) raised by at least two feet (2), in that the upper face (4) comprises not only two first housings (10) disposed parallel to each other and each adapted to receive a weft wire (28) but also at least one housing (12) substantially perpendicular to the first two housings (10), and in that at least one locking device (16) is provided on each side of a median line between the first two housings (10).

2. An accessory according to claim 1, characterized in that the first two housings each have the form of a groove (10) of which the form is adapted to that of a weft wire (28).

3. An accessory according to claim 1, characterized in that the housing (12) substantially perpendicular to the first housings (10) is formed by a cut-out in the upper face (4) of the accessory.

4. An accessory according to claim 3, characterized in that each locking device comprises a tab (16) that can be folded down associated with said housing (12), the tab (16), in its non folded down position, enabling a wire (26) to be placed in the corresponding housing (12) and in its folded down position enabling the wire (26) to be held in its housing (12).

5. An accessory according to claim 4, characterized in that the tab (16) has a substantially rectangular cut-out (18) enabling the end of a flat-bladed screwdriver to be inserted.

6. An accessory according to claim 3, characterized in that the cut-out has the form of a channel overhung by two locking tabs (16), a warp wire (26) being able to locate between the bottom of the channel and the locking tabs (16).

7. An accessory according to claim 1, characterized in that the locking devices (16) are intended to lock a warp wire (26) and are disposed on respective opposite sides of the first housings (10) intended for the weft wires (28).

8. An accessory according to claim 1, characterized in that the upper face (4) comprises at least two bores (20, 22).

9. An accessory according to claim 1, characterized in that at least one of two feet (2) is provided with fixing means (6, 8).

10. An accessory according to claim 1, characterized in that it takes the form of a part having a profiled cross-section substantially the shape of an inverted U, the branches of the U forming the feet (2) of the accessory, and the base of the U forming the upper face (4) thereof.

11. An accessory according to claim 10, characterized in that one of said branches of the U is folded at a right angle outwardly of the U at its opposite end from the base so forming a fixing rim (6).

12. An accessory according to claim 10, characterized in that the base of the U comprises said two first housings in form of two longitudinal grooves (10) of which the concave form is directed outwardly of the base of the U and furthermore two transverse cut-outs which continue over a portion of the height of the branches of the U so forming two transverse channels forming the housings (12).

13. An accessory according to claim 12, characterized in that the transverse channels are each overhung by two tabs (16), and in that the two tabs (16) of each channel are disposed on respective opposite sides of the longitudinal grooves (10) and are attached to the same edge of the channel.

14. An accessory according to claim 13, characterized in that the cut-out in the branches of the U has, not only adjacent the bottom of the channel but also adjacent the tabs (16), an inclined surface (30).

15. An accessory according to claim 1, characterized in that each locking device comprises a tab (16) that can be folded down associated with a housing (12), the tab (16), in its non folded down position, enabling a wire (26) to be placed in the corresponding housing (12) and in its folded down position enabling the wire (26) to be held in its housing (12).

16. An accessory according to claim 15, characterized in that the tab (16) has a substantially rectangular cut-out (18) enabling the end of a flat-bladed screwdriver to be inserted.

* * * * *